United States Patent [19]

Martinez-dePison

[11] 4,009,420
[45] Feb. 22, 1977

[54] SOLID STATE POWER CONTROLLER

[75] Inventor: Emilio Martinez-dePison, San Diego, Calif.

[73] Assignee: The United States of America as represented by the Secretary of the Navy, Washington, D.C.

[22] Filed: May 2, 1975

[21] Appl. No.: 574,129

[52] U.S. Cl. .................................. 361/88; 321/11
[51] Int. Cl.² ......................................... H02H 3/24
[58] Field of Search .............. 317/31, 33 SC, 33 R, 317/33 VR; 340/248 C, 248 E; 307/289, 291, 292, 290, 272, 252 B, 252 C, 252 H; 321/11, 19

[56] References Cited

UNITED STATES PATENTS

| 3,037,151 | 5/1962 | Cimerman et al. | 317/31 X |
| 3,402,334 | 9/1968 | Newton, Jr. | 307/290 X |
| 3,440,632 | 4/1969 | Tempel | 340/248 C |
| 3,449,634 | 6/1969 | Hung | 317/31 |
| 3,609,569 | 9/1971 | Todd | 307/272 X |
| 3,671,807 | 6/1972 | Milligan | 317/31 X |
| 3,805,142 | 4/1974 | Rando | 317/33 SC X |
| 3,816,809 | 6/1974 | Kuster | 317/31 X |
| 3,908,159 | 9/1975 | Griffey | 321/11 |

*Primary Examiner*—J D Miller
*Assistant Examiner*—Patrick R. Salce
*Attorney, Agent, or Firm*—R. S. Sciascia; G. J. Rubens; T. M. Phillips

[57] ABSTRACT

A solid state control system for controlling a high voltage primary power supplied to a plurality of power supplies by means of a TTL voltage level. Circuit means are provided to sense the power supply whose DC voltage goes to zero volts due to circuit anomalies, or other reasons. Upon sensing the anomaly the indicator means indicate via a storage device which power supply has failed, before interrupting the primary power.

5 Claims, 2 Drawing Figures 4,009,420

SOLID STATE POWER CONTROLLER

BACKGROUND OF THE INVENTION

This invention relates to solid state electrical controls systems and more particularly to a control system wherein the control system is isolated from the high voltage AC lines. In controlling the operation or conductivity of a semiconductor switching device, for example, one connected to a relatively high voltage supply source, control signals are often developed in a circuit operating on a relatively low voltage, such as conventional logic circuits. There is difficulty in providing circuitry that is sensitive to the conditions of the power supply and providing control signals which will interrupt the faulted power supply in response to a sensed signal and at the same time maintain it isolated from the high AC voltage being controlled.

SUMMARY OF THE INVENTION

The present invention provides a solid state controller for remotely turning alternating power on and off by providing means to initiate a TTL control signal voltage to an electro-optically isolated solid state relay. Sensing means are provided to sense a short circuit condition and provide TTL control signals for indicating which power supply has failed and for interrupting the AC input to the power supply.

OBJECTS OF THE INVENTION

An object of the present invention is to provide a solid state controller which will switch alternating power on and off from a remote location by means of a TTL voltage level controlling signal.

Another object of the invention is the provision of a power controller which operates from a remote location for turning on and off alternating current power supplying a plurality of power supplies in response to anomalies sensed in the power supply circuits.

A further object of the invention is the provision of a solid state power controller which operates from a remote location for turning on and off alternating current power supplying a plurality of power supplies and having circuit means for sensing, and indicating which power supply has failed and simultaneously generating a control signal to interrupt the AC input power to the power supplies.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
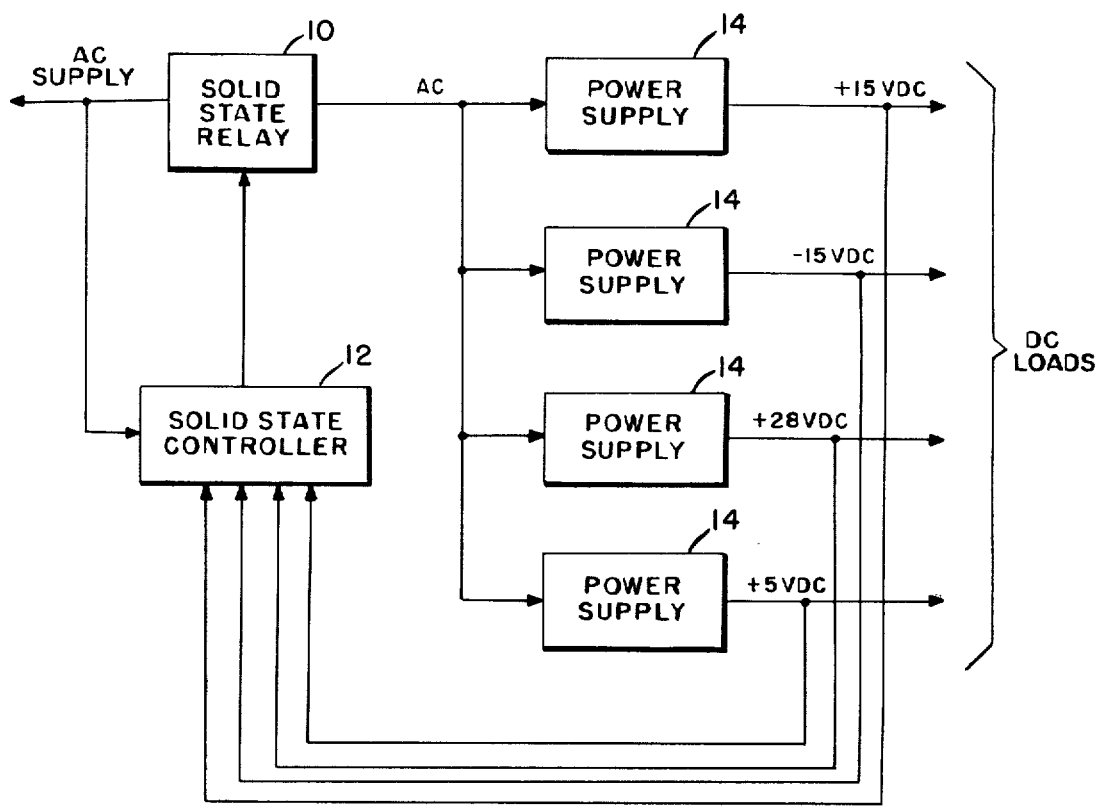
FIG. 1 is a block diagram showing the general configuration of the invention.

Referring now to the drawings wherein there is shown in FIG. 1 a solid state relay 10 which is preferably a Model D1210 manufactured by Crydom Co. connected in series in an alternating current power supply in series with loads 14. Loads 14 in the illustration shown may be for example, alternating current to direct current power converters for supplying various DC voltages to DC loads (not shown). As shown in FIG. 1, DC voltages of +28, +15, +5, and −15 volts are provided by the various power supplies 14. The solid state controller 12 provides a control signal to the solid state relay 10 for controlling the AC supply voltage to power supplies 14. Power supply for solid state controller 12 is provided from the same alternating current power supply. Voltages are sensed and fed back from the DC voltage outputs of power supplies 14 to solid state controller 12 which responds in the event of an anaomaly as for example, a short circuit which will cause the DC voltage to become zero and provide a control signal to interrupt the power supplied to power supplies 14.

Figure 2:
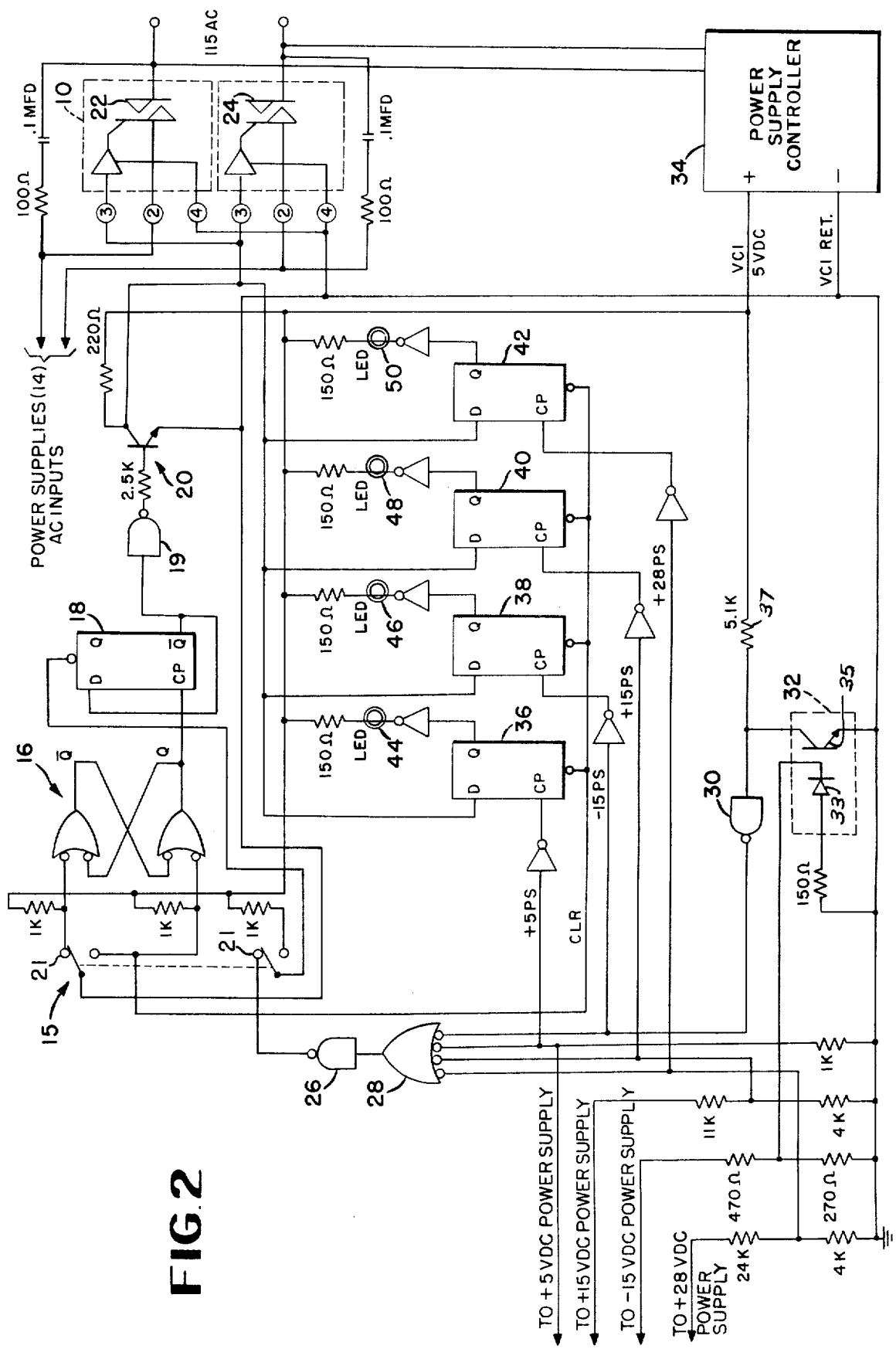
FIG. 2 is a schematic diagram of the control circuit embodying the invention in combination with the power supply to be controlled.

Referring now to FIG. 2 wherein the solid state controller 12 is shown in detail, the two triacs 22 and 24 with their triggering circuitry form a two pole solid state relay 10 to be controlled. An on-off switch 15 which as shown is a double pole-double throw switch with momentary action is coupled to a bistable flip-flop circuit 16 the output of which is coupled to a second bistable flip-flop 18 for generating an output pulse that is fed through NAND gate 19 to the base of transistor 20. The output signal taken from transistor 20 is the direct current command signal that controls the solid state relay 10. The Crydom Model D1210 is preferred as the solid state relay 10 because it opto-electronically isolates the driving circuitry from the high voltage AC being controlled.

With all the power supplies 14 disconnected from the alternating current source by means of relay 10, and momentary switch 15 in the off position. The direct current load voltage sensing points are at zero direct current voltage. Flip-flop 18 is then provided with a logical 0 via the off contact 21 of switch 15. The logical 0 presets flip-flop 18 and causes it to provide a logical low that is inverted to a high by NAND gate 19 to saturate transistor 20 and consequently turn relay 10 off.

In order to apply power to connector 14, switch 15 is depressed once; this action sets flip-flop 16 to generate a positive going pulse required to couple the logical 0 of flip-flop 18 to its data input terminal D which makes a logical 0 to appear at the Q terminal. This in turn cuts off transistor 20 making its output a logical 1 which is the control signal required to turn the relay 10 on and thus energizes the power supplies 14 connected as shown in FIG. 1. This makes all of the sensing points logical "ones" and therefore flip-flop 18 remains reset. To turn the power off, switch 15 is depressed once, flip-flop 16 is set, clocking in a logical 1 that appears at the Q terminal of flip-flop 18. This makes the Q output of flip-flop 18 low saturating transistor 20 and therefore turning the relay 10 off to interrupt the alternating current power to power supplies 14.

Monitoring of the operating conditions of the loads is accomplished by connecting sensing points to the outputs of the power supplies 14. The power supply test points are connected to the inputs of NOR gate 28 through resistor networks to provide the proper voltage levels. The negative short circuit voltage is fed through an isolator circuit 32 to provide a positive voltage to NOR gate 28. The isolator circuit 32 comprises a light-emitting diode 33 which emits light to an adjacent photo transistor 35. An output voltage across load resistor 37 is generated and fed to the input of NAND gate 30 which provides a positive voltage to NOR gate 28.

Whenever switch 15 is depressed to turn the power on the monitoring flip-flops 36, 38, 40, and 42 are cleared by means of the input signal applied to the "clear" input terminals of the flip-flops. The flip-flops are then ready to sense any power failure. If while the power is on and any power supply fails, the particular flip-flop connected to that power supply will sense the failure by a rising voltage that is coupled to the clock pulse input of the particular flip-flop involved. This flip-flop then becomes set and as a result, energizes one of light emitting diodes 44, 46, 48 and 50.

The voltage generated when a power failure occurs and the DC voltage goes to zero, at least one of the inputs to NOR gates 28 will be "zero." The output from NOR gate 28 is fed to NAND gate 26 and provides a logical "zero" signal that is fed through switch contact 21 to the pre-set input of flip-flop 18. This causes transistor 20 to saturate and remove the control signal, turning off relay 10. Relay 10 will remain off until switch 15 is actuated to the "on" position. Pressing switch 15 to the "on" position provides a clear signal to all the monitoring flip-flops 36, 38, 40, and 42. By removing the faulty supply and leaving its sensor point open, power may then be restored to the remaining power supplies.

Obviously many modifications and variations of the present invention are possible in the light of the above teachings. It is therefore to be understood that within the scope of the appended claims the invention may be practiced otherwise than as specifically described.

What is claimed is:

1. A solid state control circuit for controlling the application of an AC source to a plurality of power supplies comprising:
   a. a source of AC voltage;
   b. a solid state relay means having a pair of load terminals and a control terminal;
   c. a plurality of load circuits connected in circuit with said load terminals to said AC source;
   d. bistable flip-flop circuit means for providing first and second output signals;
   e. first circuit means coupled to said bistable flip-flop circuit means and being responsive to said first output signal for generating a control signal for causing said relay to conduct and provide AC current to said loads;
   f. said first circuit means being responsive to said second output signal for turning off said relay;
   g. second circuit means coupled between each of said plurality of load circuits and said bistable flip-flop circuit means for providing an output pulse in response to a power supply failure in any one of said load circuits to cause said bistable flip-flop circuit to generate said second output signal.

2. The control circuit of claim 1 wherein said second circuit means includes a converter means for converting a negatively sensed voltage to a positive signal to be applied to said bistable flip-flop circuit.

3. The control circuit of claim 2 wherein said converter means comprises a light emitting diode connected to said negative sensed signal for producing a light in response to the negatively applied signal and a photo-sensitive transistor positioned adjacent to said light emitting diode for detecting light and generating a positive output voltage which is applied to said bistable flip-flop circuit.

4. The control circuit of claim 3 wherein said second circuit means includes a NOR gate having inputs connected to said load and being responsive to any voltage being generated when an anomaly occurs at the load for providing a trigger pulse for said bistable flip-flop.

5. The control circuit of claim 1 further comprising a plurality of indicator means coupled to said second circuit means for indicating which of said plurality of load circuits has a power supply failure before said relay is turned off.

* * * * *